US006823675B2

(12) United States Patent
Brunell et al.

(10) Patent No.: US 6,823,675 B2
(45) Date of Patent: Nov. 30, 2004

(54) ADAPTIVE MODEL-BASED CONTROL SYSTEMS AND METHODS FOR CONTROLLING A GAS TURBINE

(75) Inventors: Brent Jerome Brunell, Clifton Park, NY (US); Harry Kirk Mathews, Jr., Clifton Park, NY (US); Aditya Kumar, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 139 days.

(21) Appl. No.: 10/293,078

(22) Filed: Nov. 13, 2002

(65) Prior Publication Data

US 2004/0123600 A1 Jul. 1, 2004

(51) Int. Cl.[7] .................................................. F02G 9/00
(52) U.S. Cl. ...................................... 60/773; 60/39.231
(58) Field of Search .......................... 60/772, 773, 793, 60/39.21, 39.22, 39.24, 39.25, 39.26, 39.27, 39.281, 39.282, 794, 795, 39.3; 701/100

(56) References Cited

U.S. PATENT DOCUMENTS

| | | | | |
|---|---|---|---|---|
| 3,851,157 A | | 11/1974 | Ellis | |
| 4,423,594 A | | 1/1984 | Ellis | |
| 4,490,791 A | * | 12/1984 | Morrison | 701/100 |
| 2003/0093211 A1 | * | 5/2003 | Zagranski | 701/100 |
| 2003/0131605 A1 | * | 7/2003 | Meisner | 60/773 |

OTHER PUBLICATIONS

Gastineau, Z.D., "Robust, Multivariable, Quantitative Design of an Adaptive Model–Based Control for jet Engines", NTIS report No. AFRLPR–WP–TR–1999–2069, Jun. 7, 1998.*

Orme, J.S., "Performance Seeking Control Program Overview", NTIS, Aug. 1993.*

Simon, L.D. et al., "Adaptive Optimization of Aircraft Engine Performance using Neural Networks", NTIS report No. ARL–TR–76 Nov. 01, 1995.*

Kopasakis, G. et al., "Adaptive Instability Suppression Controls in a Liquid–Fuel Combustor", NTIS report No. AIAA–2002–4075, Aug. 2002.*

Gastineau, Z. D. et al., "Robust Model–Based Control for Jet Engines", AIAA 98–3752, Jul. 13–15, 1998.*

Qi, F. et al., "A Model–Based approach to the Control of an Aircraft Gas–Turbine Engine", 93–GT–402, 1993.*

Lonbardo, G., "Adaptive Control of a Gas Turbine Engine for Axial Compressor Faults", 96–GT–445, Jul. 6, 1996.*

B. G. Vroemen et al., *Nonlinear Model Predictive Control of a Laboratory Gas Turbine Installation*, Journal of Engineering for Gas Turbine and Power, Oct. 1999, vol. 121, pp. 629–634 (Eindhoven University of Technology, The Netherlands).

* cited by examiner

*Primary Examiner*—Justine Yu
*Assistant Examiner*—William Rodriguez
(74) *Attorney, Agent, or Firm*—Penny A. Clarke; Patrick K. Patnode

(57) ABSTRACT

Adaptive model-based control systems and methods are described so that performance and/or operability of a gas turbine in an aircraft engine, power plant, marine propulsion, or industrial application can be optimized under normal, deteriorated, faulted, failed and/or damaged operation. First, a model of each relevant system or component is created, and the model is adapted to the engine. Then, if/when deterioration, a fault, a failure or some kind of damage to an engine component or system is detected, that information is input to the model-based control as changes to the model, constraints, objective function, or other control parameters. With all the information about the engine condition, and state and directives on the control goals in terms of an objective function and constraints, the control then solves an optimization so the optimal control action can be determined and taken. This model and control may be updated in real-time to account for engine-to-engine variation, deterioration, damage, faults and/or failures using optimal corrective control action command(s).

47 Claims, 13 Drawing Sheets

CURRENT TECHNOLOGY

ADAPTIVE MODEL-BASED CONTROL SYSTEMS AND METHODS FOR CONTROLLING A GAS TURBINE

STATEMENT REGARDING FEDERALLY SPONSORED RESEARCH & DEVELOPMENT

This invention was made with Government support under contract number NAS3-01135 awarded by NASA to General Electric's Aircraft Engines Unit. The Government has certain rights in the invention.

FIELD OF THE INVENTION

The present invention relates generally to systems and methods for controlling a gas turbine engine. More specifically, the present invention relates to adaptive model-based control systems and methods that maximize capability after deterioration, fault, failure or damage to one or more engine components or systems so that engine performance and/or operability can be optimized.

BACKGROUND OF THE INVENTION

Mechanical and electrical parts and/or systems can deteriorate, fail or be damaged. Any component in a gas turbine system, including engine components, sensors, actuators, or any of the engine subsystems, is susceptible to degradation, failure or damage that causes the engine to move away from nominal conditions. The effect that these upsets have on the gas turbine performance range from no effect (i.e., possibly due to a single failed sensor in a multi-sensor system) to a total loss of engine power or thrust control (i.e., for a failed actuator or damaged engine component). The technical steps that are required for engine health management to regain a desired level of performance given a change in performance from nominal include: detection (i.e., determining the presence of a change), isolation (i.e., determining the location or cause of the change), identification (i.e., determining the magnitude of the change), and accommodation (i.e., reconfiguring or adapting the controls to achieve optimal available performance and/or operability). There is great difficulty in performing all of these steps in an optimal fashion for all degraded, failed and/or damaged modes of the gas turbine. For this reason, approaches based on fault and damage adaptation of model-based controls appear well suited for fast detection and identification of engine degradation, faults, failures and damage, as well as for adequate control recognition and reconfiguration in the presence of such upsets, so that engine performance and/or operability can be optimized.

Currently, gas turbine systems rely on sensor-based control systems, in which operating goals and limits are specified and controlled in terms of available sensed parameters. Online engine health management is typically limited to sensor failure detection (i.e., range and rate checks), actuator position feedback errors, and some selected system anomaly checks, such as stall detection, rotor overspeed, and other such indications of loss of power or thrust control. When an engine component or system fails, or if a fault is detected therein, the fault/failure of the component/system is handled on an individual basis (i.e., each component/system is controlled by its own control regulator or heuristic open-loop logic). Additionally, fault accommodation logic in existing control systems only leads to an a priori determined set of possible corrective control actions that can be taken to correct a given fault or failure. Therefore, if the particular fault or failure has not been previously programmed into the set of possible corrective control actions, the control system may not select the optimal solution to correct the fault/failure because the optimal solution may not be present. Damage situations, such as when a rotating engine component is damaged, are not even currently addressed specifically by existing control systems.

There are presently no deterioration, fault, failure and/or damage adaptive model-based control systems and methods available. Thus, there is a need for such control systems and methods. There is also a need for such control systems and methods wherein the models, optimizations, objective functions, constraints and/or parameters in the control system modify, update and/or reconfigure themselves whenever any engine component or system moves away from nominal so that as much performance and/or operability as possible can be regained. There is yet a further need for such systems and methods wherein the control system updates itself in real-time. There is also a need for such systems and methods to be automated using a computer. There is still a further need for such systems and methods to take information about detected deterioration, faults, failures and damage and incorporate such information into the proper models, optimizations, objective functions, constraints and/or parameters in the control system to allow the control system to take optimized action given the current engine condition. There is also a need for such systems and methods to allow any level of deterioration, faults, failures or damage to be accommodated, not just deterioration, faults, failures or damage that have a priori solutions already programmed into the system. Furthermore, there is a need for such systems and methods to be capable of being used to control gas turbines, such as the gas turbines in an aircraft engine, power plant, marine propulsion, or industrial application.

SUMMARY OF THE INVENTION

Accordingly, the above-identified shortcomings of existing systems and methods are overcome by embodiments of the present invention, which relates to adaptive model-based control systems and methods. An embodiment of this invention comprises systems and methods wherein the models, optimizations, objective functions, constraints and/or parameters in the control system modify, update and/or reconfigure themselves whenever any engine component or system moves away from nominal so that as much performance and/or operability as possible can be regained. In some embodiments, the models, optimizations, objective functions, constraints and/or parameters in the control system update themselves in real-time, and in some embodiments the systems and methods are automated using a computer. Embodiments of the systems and methods of this invention may take information about detected deterioration, faults, failures and damage and incorporate such information into the models, optimizations, objective functions, constraints and/or parameters in the control system to allow the control system to take optimized action given the current engine condition. Embodiments of the systems and methods of this invention may allow any level of deterioration, faults, failures or damage to be accommodated, not just deterioration, faults, failures or damage that have a priori solutions already programmed into the system. Furthermore, embodiments of the systems and methods of this invention may be capable of being used to control gas turbines, such as the gas turbines in an aircraft engine, power plant, marine propulsion or industrial application.

This invention comprises adaptive model-based control systems and methods wherein the model(s) is adapted to represent the engine that it is controlling. The adaptation of the model(s) allows the control system to make more informed and/or optimal decisions about how to adapt or reconfigure the control when the engine has moved away from nominal conditions. This adaptation includes effects from engine-to-engine variation, deterioration, faults, failures and/or mechanical damage in the engine components themselves, or in any of the engine control systems or components thereof.

These adaptive model-based control systems may detect deterioration, faults, failures and/or damage, and then take such information and incorporate it into the models, optimizations, objective functions, constraints and/or parameters in the control system, preferably in real-time. This information allows the control system to take optimized action given the current engine conditions. Since these control systems are updated and adapted in real-time, they allow for any level of deterioration, faults, failures or damage to be accommodated, not just deterioration, faults, failures and damage that have a priori solutions already programmed into the model(s) in the control system.

These adaptive model-based control systems and methods are designed to reduce operator workload and enable autonomous gas turbine operation by: (1) providing sufficient information to the supervisory control so that the supervisory control can manage propulsion, power and/or electrical output for the given mission or event; (2) elevating the level of autonomy in the engine control; (3) aiding the integration of the engine control with the supervisory control; and/or (4) improving engine-related decision-making capabilities.

Many model-based control systems are created by designing a model of each component and/or system that is to be controlled. For example, there may be a model of each engine component and system—compressor, turbine, combustor, etc. Each model comprises features or dynamic characteristics about the component's or system's behavior over time (i.e., speed accelerations being the integral of the applied torques). From the model(s), the system may control, estimate, correct or identify output data based on the modeled information. For example, if thrust or power is lost because an actuator is stuck in a specific position, the system can hold the control to that actuator fixed as an input constraint, and then adapt the controls that are output to the other actuators so that no other constraints are violated, and as much lost thrust or power as possible can be regained so that the gas turbine may continue operation.

This invention allows either performance or operability to be optimized. If the performance-optimizing mode is selected, the objectives include attempting to maximize or minimize thrust, power, electricity, specific fuel consumption, part life, stress, temperatures, pressures, ratios of pressures, speed, actuator commands, flows, dollars, costs, and the like. This will lead to longer engine run times, fuel savings, increased transient performance, increased parts life, and/or lower costs for operating the engines. If the operability-optimizing mode is selected, the objectives include attempting to manage stall margin, increase operability, and prevent in-flight mishaps. This will lead to a reduction of loss of thrust or loss of power control events, increased engine survivability, and increased engine operating time in the presence of deterioration, faults, failures and/or damage.

This invention comprises adaptive model-based control systems and methods that comprise a system model, estimators, model-based diagnostics, and a model-based control(s) or model-predictive control(s). Physics-based models and empirical models provide analytical redundancy of sensed engine parameters, and access to unmeasured parameters, for control and diagnostics purposes. These models also predict future behavior of the system. Estimators associated with the various models estimate the model state, and ensure that the models are providing accurate representations of the engine and its subsystems and components. Model-based diagnostics provide accurate engine condition information (i.e., deterioration, damage, and engine system faults and/or failures), relying both on models and sensed parameters. Model-predictive control maintains robust, high-performance control of the engine in the presence of component and/or system deterioration, faults, failures and/or damage and mission segment-specific operational goals, using the predictive capabilities of the model and information from the model-based diagnostics. Overall health management of the engine comes from the confluence of on-board diagnostics, a fault-tolerant control, and the adaptation of the model-based controller(s).

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

For the purposes of promoting an understanding of the invention, reference will now be made to some preferred embodiments of the present invention as illustrated in FIGS. 1–13, and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Well-known circuits, programming methodologies, structures and control systems are utilized in this invention but are not described in detail herein so as not to obscure this invention. Any modifications or variations in the depicted adaptive model-based control systems and methods, and such further applications of the principles of the invention as illustrated herein, as would normally occur to one skilled in the art, are considered to be within the spirit of this invention.

The present invention comprises adaptive model-based control systems and methods. These systems and methods may detect deterioration, faults, failures or damage to an engine, and incorporate such information into the proper models, optimizations, objective functions, constraints and/or parameters in the control system to allow the control system to quickly take optimized action to regain as much performance and/or operability as possible given the current engine condition.

In embodiments of this invention, any physical system, control system or property of the engine or engine subsystem may be modeled, including, but not limited to, the engine itself, the gas path and gas path dynamics; actuators, effectors, or other controlling devices that modify or change any engine behavior; sensors, monitors, or sensing systems; the fuel metering system; the fuel delivery system; the lubrication system; and/or the hydraulic system. The models of these components and/or systems may be physics-based models (including their linear approximations). Additionally or alternatively, the models may be based on linear and/or nonlinear system identification, neural networks, and/or combinations of all of these.

Figure 1:
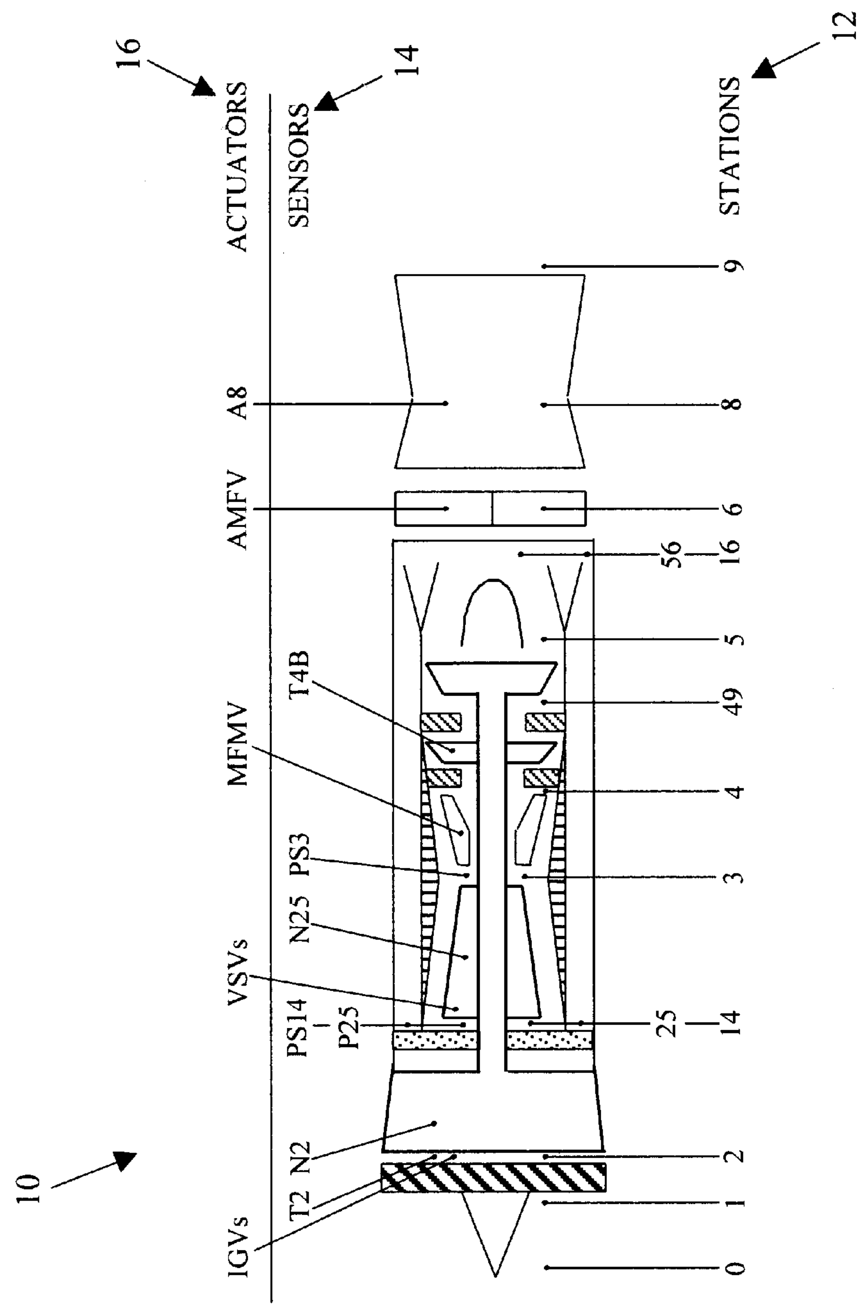
FIG. 1 is schematic diagram showing the layout of an engine that may be controlled by one embodiment of this invention.

Gas turbines are air breathing engines that produce work or energy based on the Brayton thermodynamic cycle. Some non-limiting examples of gas turbines include: aircraft engines, power systems, propulsion engines for marine applications, turbines used as pumps, turbines used in combined cycle power plants, and turbines used for other industrial applications. In gas turbines, thermal energy is drawn from the combustion of fuel with air, the combustion of fuel with an oxidizer, chemical reactions and/or heat exchange with a thermal source. The thermal energy is then converted into useful work. This work can be output in the form of thrust, shaft power or electricity. The performance or operation of these engines is controlled through the use of actuators. Some non-limiting examples of actuators in gas turbines include fuel metering valves, inlet guide vanes, variable stator vanes, variable geometry, bleed valves, starter valves, clearance control valves, inlet bleed heat, variable exhaust nozzles, and the like. Some non-limiting examples of sensed engine values include temperatures, pressures, rotor speeds, actuator positions, and/or flows. One exemplary schematic of an afterburning gas turbine engine layout 10, as well as the station designations 12, sensors 14, and actuators 16, is shown in FIG. 1, where the actuators comprise:

| | |
|---|---|
| IGV | Inlet Guide Vane |
| VSV | Variable Stator Vane |
| MFMV | Main Fuel Metering Valve |
| AFMV | Afterburning Fuel Metering Valve |
| A8 | Variable Exhaust Nozzle |

and the sensors comprise:

| | |
|---|---|
| T2 | Fan Inlet Temperature |
| N2 | Fan Speed |
| PS14 | Fan Static Exit Pressure |
| P25 | Compressor Inlet Pressure |
| N25 | Core Speed |
| PS3 | Compressor Discharge Static Pressure |
| T4B | High-pressure Turbine Exit Temperature |

This invention uses a systematic approach to accommodating changes in the engine system and the engine system components. This accommodation is accomplished by updating the model in the model-based control system with any detected changes. These changes may include engine-to-engine variation, deterioration, mechanical, electrical or chemical faults, failures, or damage to the engine or any of the engine components, and mechanical, electrical or chemical faults, failures or damage to the control system and/or its components. The model(s) in the control system may be adapted by using a filter, tracking filter, logic or other suitable method to modify states, variables, quality parameters, scalars, adders, constraints, limits or any other adaptable parameter of the model so that the performance and limitations of the model match that of the engine after the parameter is changed. Using the information about any detected changes, together with the updated model, the model-based control system is able to evaluate the current condition of the engine and take a more optimized control action than would have been possible if the model had not been updated and if such information had not been passed to the control system. One advantage of these systems and methods is that, since they can be updated in real-time, they allow for any level of deterioration, fault, failure or damage to be accommodated, not just deterioration, faults, failures and damage that have a priori solutions already programmed into the model(s) in the control system.

Controlling the performance and/or operability of a gas turbine requires analyzing multiple variables to determine the appropriate control values that are needed to produce the desired output. These multiple variables can affect each other in a nonlinear manner, and thus must be operated on accordingly. Creating a model(s) to represent the various effects that multiple variables have on each other within a specific system can be difficult when accuracy and response speed are important, such as with high performance aircraft and/or modern power systems or the like. Since not every eventuality is likely to be covered in such models, it is desirable for such models to reconfigure, adapt and learn to make predictions or corrections based on engine sensor data. In this invention, such adaptability for normal or deteriorated conditions comes from using an estimator or tracking filter to modify model inputs, outputs, or interior parameters. Such adaptability for faults, failures or damage conditions comes from using the diagnostics, which can select between different models, modify model inputs, outputs, or interior parameters, or can modify the optimizations, objective functions, constraints, and/or parameters in the control.

Then, given the modified models, optimizations, objective functions, constraints and/or parameters, an optimizer may be used so that optimal performance and/or operability can be obtained.

Figure 2:
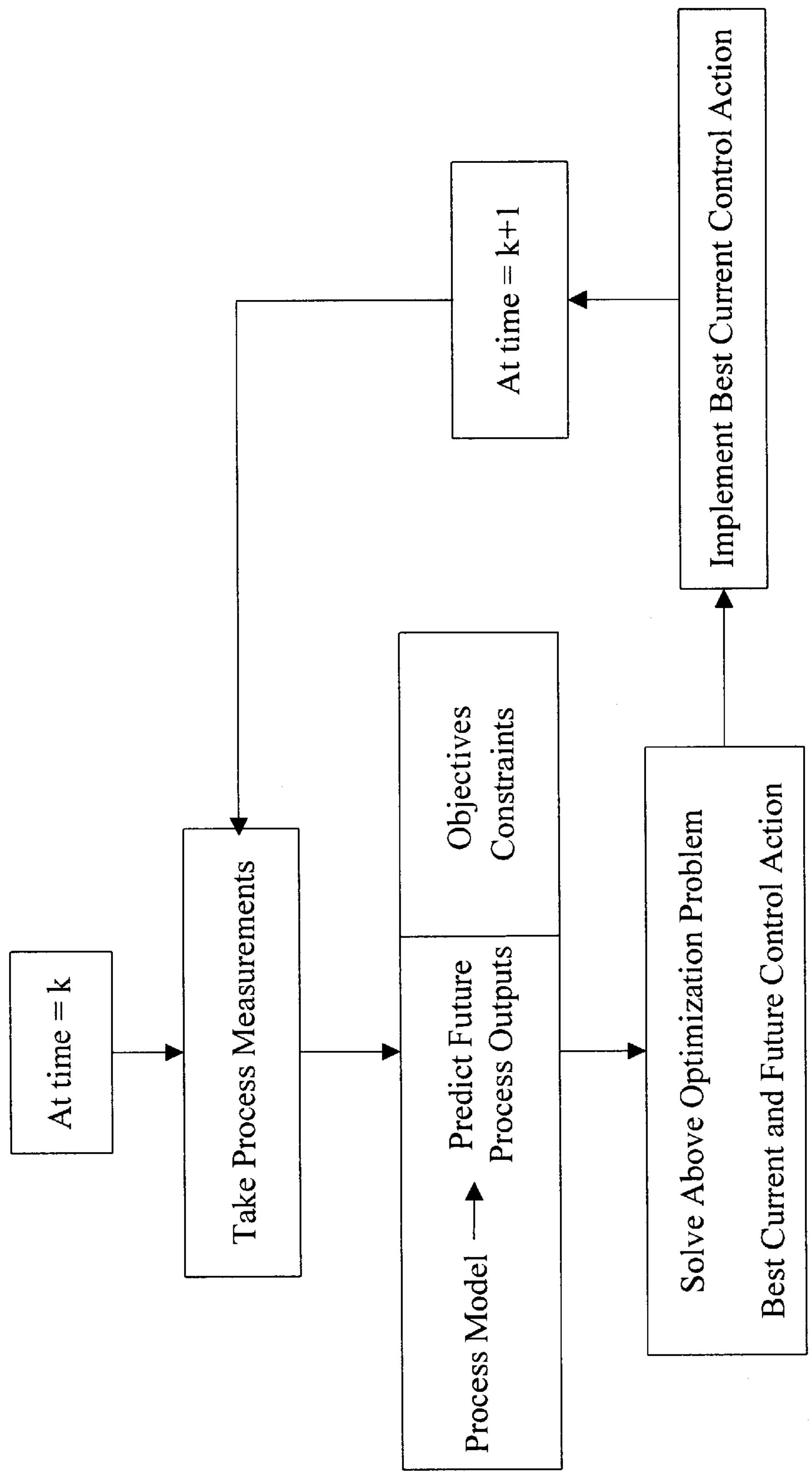
FIG. 2 is a flowchart showing the basic steps followed by a model-predictive controller in one embodiment of this invention.

Strong nonlinearities are present in gas turbine engines due to the large range of operating conditions and power levels experienced during operation. Also, turbine operation is restricted due to mechanical, aerodynamic, thermal and flow limitations. Model predictive controls are ideal for such environments because they can specifically handle the nonlinearities, and both the input and output constraints of many variables, all in a single control formulation. Model predictive controls are full state feedback controls that use a model of the process/system/component to predict the output up to a certain instant of time, based on the inputs to the system and the most recent process measurements. A flowchart showing the basic steps followed by a model-predictive controller as used in embodiments of this invention is shown in FIG. 2. The main idea in model-predictive controls is to use the model predictions of the performance over the next time interval to select the control input sequence via constrained optimization, starting from the current system state. Generally speaking, model predictive control is a control paradigm used to control processes that must satisfy performance, safety, and/or environmental constraints.

The models in the model-based controls of this invention are designed to replicate both transient and steady state performance. These models can be used in their nonlinear form, or they can be linearized or parameterized for different operating conditions. Model-based control techniques take advantage of the model to gain access to unmeasured engine parameters, in addition to the normal sensed parameters. These unmeasured parameters may comprise, for example, thrust, stall margins, component efficiencies, and/or airflows. These controls can be multiple-input multiple-output (MIMO) to account for interactions of the control loops, they can be model-based, and they can have limits or constraints built as an integral part of the control formulation and optimization to get rid of designing controllers for each limit. The current strategy for this invention involves trying to collapse the controller into an objective function(s) and constraint(s) that can be used as part of a finite horizon constrained optimization.

Figure 3:
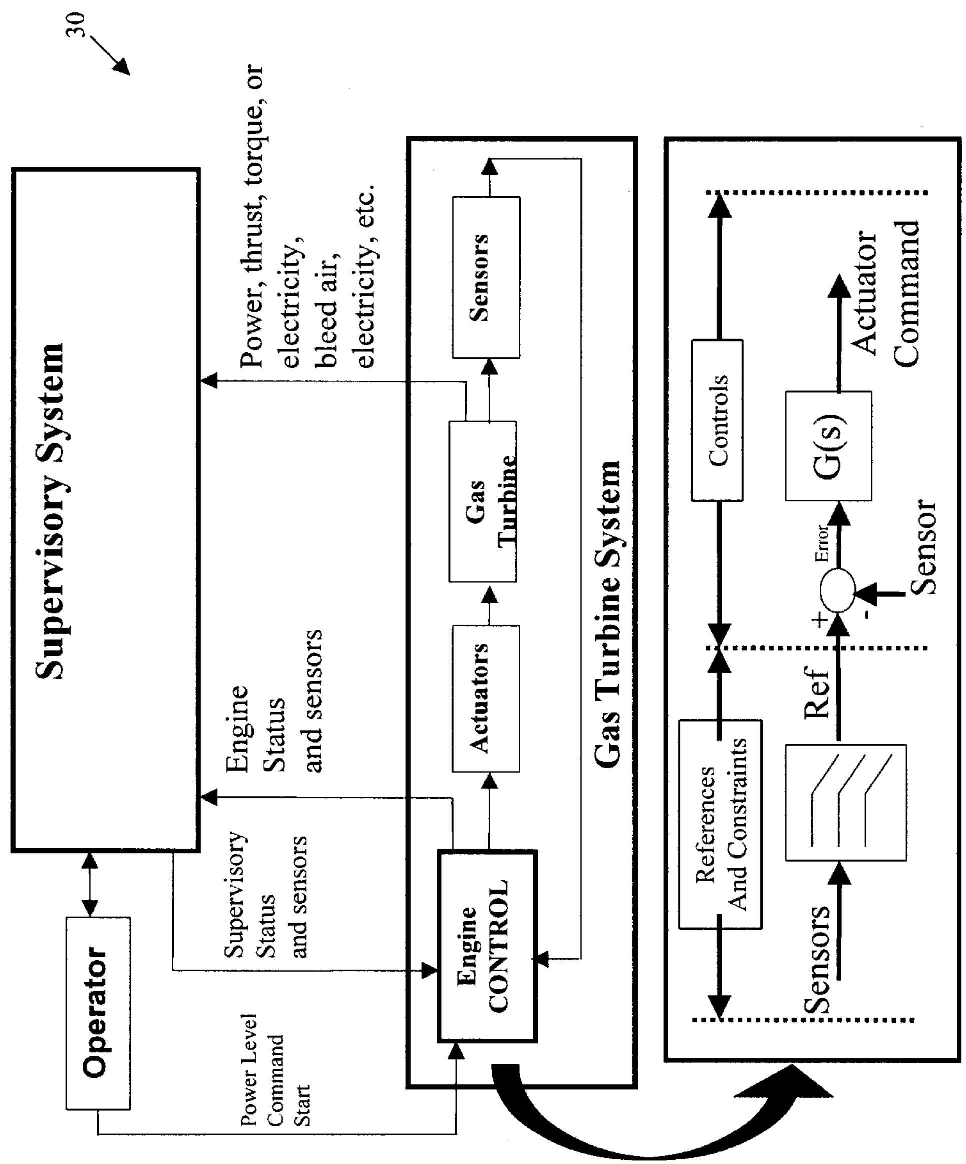
FIG. 3 is a schematic diagram showing the architecture of a typical control system for a gas turbine.

A schematic of a current control system for an aircraft 30 is depicted in FIG. 3. The adaptive model-based control systems of this invention are superior to current control systems, and may comprise several elements, such as: one or more models, one or more estimators, one or more diagnostic or fault detection algorithms, one or more reconfigurable model-based controls, one or more optimizers, and a master mode selector.

In order to be able to detect smaller failures and make more optimal control decisions, the control system preferably has as much information as possible about the engine or engine subsystem that it is controlling. One of the best ways to gain this information about the system is to use a dynamic model inside the control. Doing this provides information about how different engine parameters should respond given the current ambient conditions and actuator commands, the relationships between parameters in the system, the relationships between measured and unmeasured parameters, and the parameters that indicate the health of the engine. If the model is dynamic, then all this information is found on both a steady state and transient basis. The model can also be used to analyze a profile of past measurements or current performance, or it can be used to predict how the engine will behave over a future time horizon. The model can be linear or nonlinear, physics-based, and/or system identification-based. The model could represent each of the main components of the engine at a system level, including for example the inlet, fan, compressor, combustor, high pressure turbine, low pressure turbine, afterburner, variable area exhaust nozzle, and other components or subsystems including actuators, fuel systems, and lubrication systems or the like. In embodiments of this model, the nominal engine or subsystem steady state and transient performance are recreated and used inside the model-based control and estimator. Other embodiments may use models with faulted, failed, or damaged characteristics in a single or multi-model fault diagnostic system.

Because each engine is different, deteriorates, and may become faulted or damaged, the model should be able to track or adapt itself to follow such changes. The model should preferably reveal current information about how a particular engine is running at a given time. This allows the future behavior of the engine to be more accurately predicted, and allows smaller faults or damage levels of the engine to be detected. Engine parameters and states are two areas of the model that can be modified to match the engine model to the current engine. A parameter estimator may be used to determine the engine parameters, and a state estimator may be used to determine the states.

Figure 4:
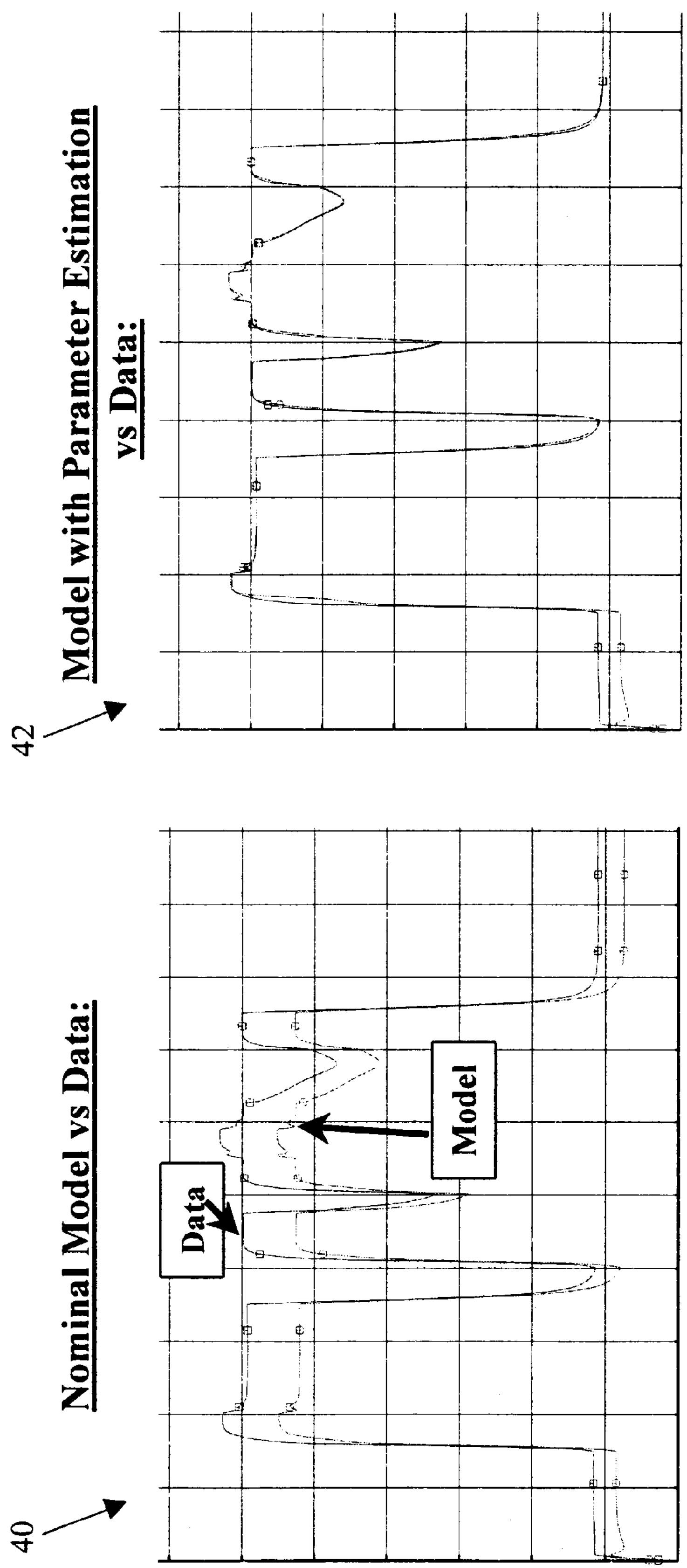
FIG. 4 is a graphical representation showing a model being tracked to an engine via a parameter estimator.

A parameter estimator estimates and modifies parameters in the engine model so as to reduce the error between the engine sensors and the model sensors. This is called tracking the model to the engine. FIG. 4 depicts one example of a model being tracked to the engine. This figure shows that the nominal model data has a large percentage deviation from the engine data 40, and that after tracking, the error between the engine data and the model data is significantly reduced 42. This variance reduction allows the sensitivity to deterioration, faults, failures, or damage to be increased, and allows for better predictive abilities. The parameters that are modified usually fall in the class called quality parameters (i.e., component efficiencies, flow, input scalars, output scalars, and/or adders). These quality parameters, like component efficiencies, can be used as inputs to the diagnostic algorithms. For example, if the compressor efficiency drops by a couple of points during steady state operation, it may indicate that damage has occurred in the compressor. In embodiments, the parameter estimator may work in real-time on both transient information and steady state information.

Figure 5:
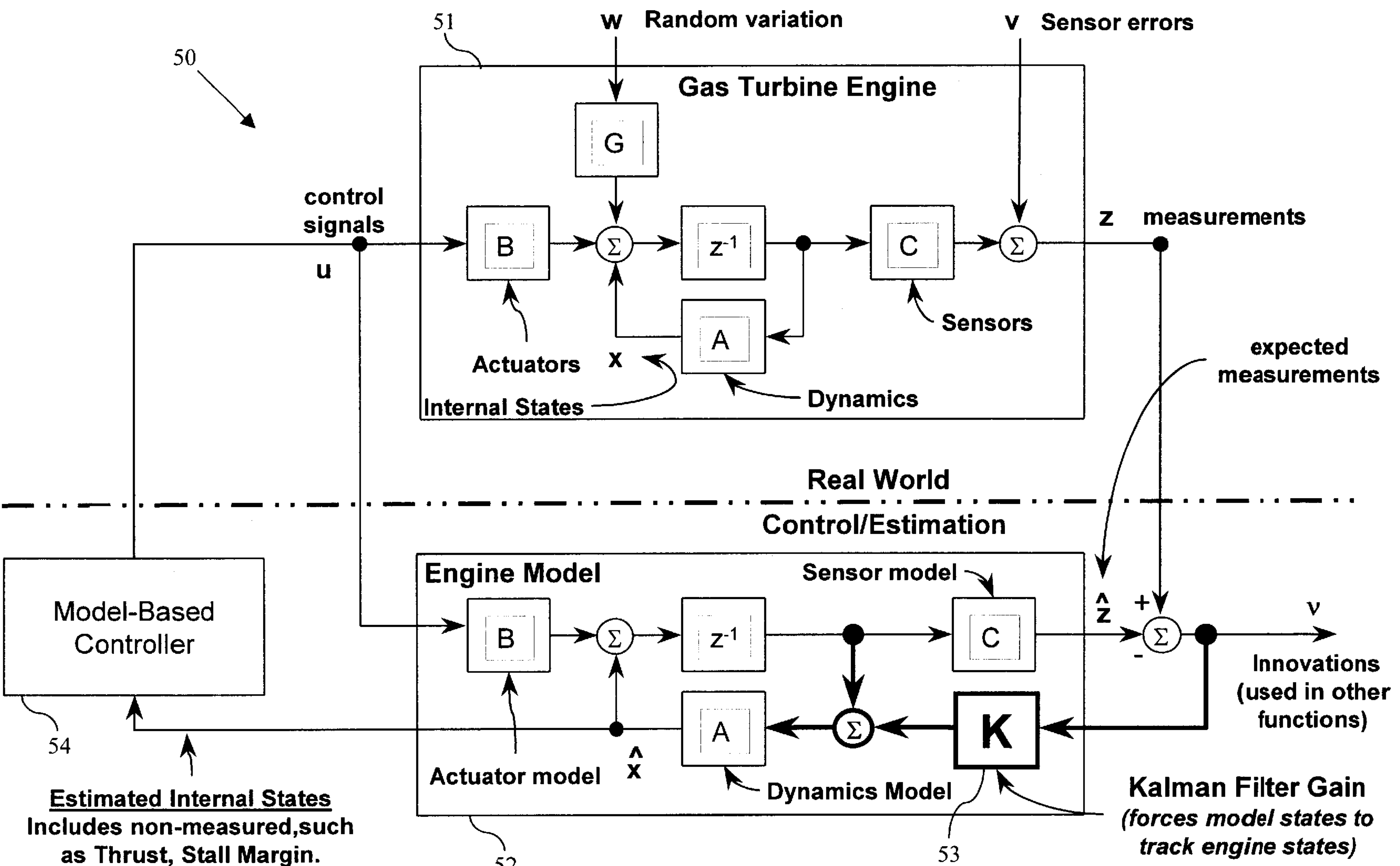
FIG. 5 is a schematic diagram showing the architecture of a state estimator in one embodiment of this invention.
Figure 6:
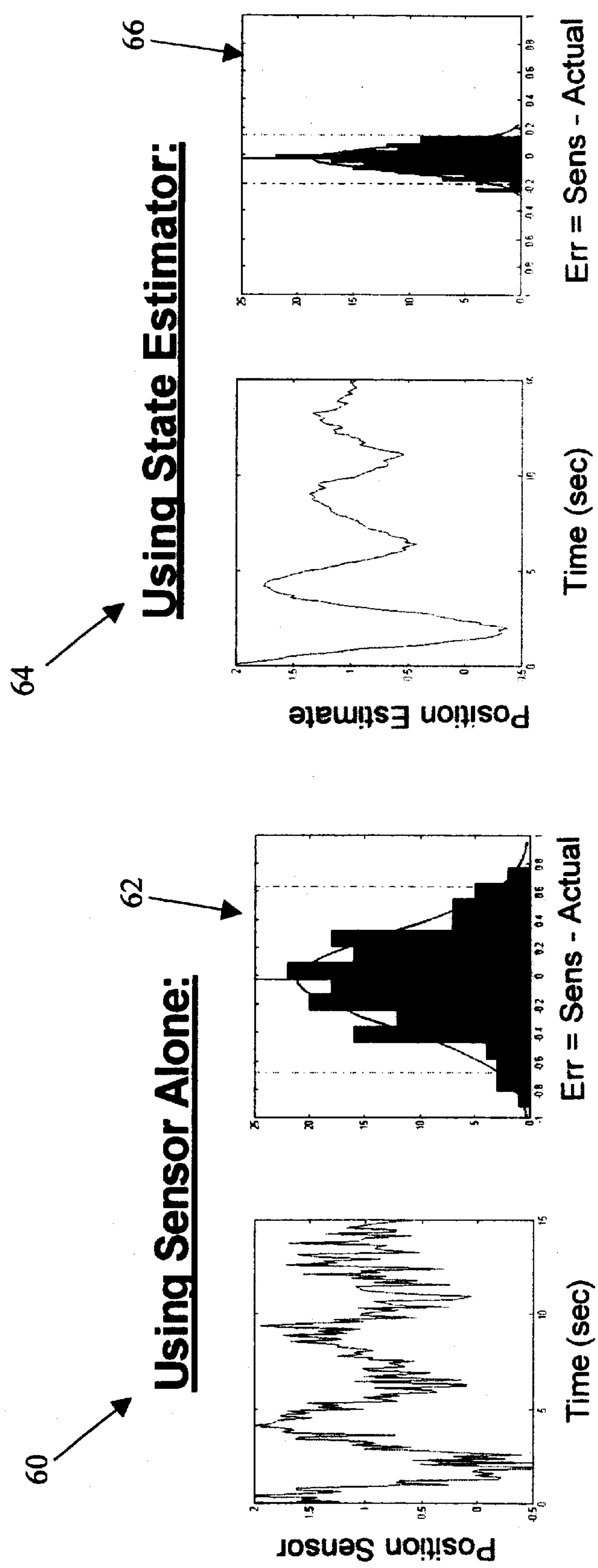
FIG. 6 is a graphical representation showing how using a state estimator allows a much more accurate value for the actual position of a mass-spring-damper to be determined than by using only a sensor.

A state estimator may be used to further aid in tracking the model to the engine. The state information may also be used to initialize the model-based control 54 at each time interval. Since the model-based control 54 is a full state controller, it can use the estimate of the current state of the engine to initialize and function correctly. One exemplary embodiment of the architecture for a state estimator 50 is shown in FIG. 5. This figure represents the real engine 51 as a discrete state space model with process variation (w) and sensor noise (v) representing the differences between the real engine 51 and the engine model 52 at the bottom of the figure. The goal of the state estimator 50 is to determine the optimum gain K 53 to account for the differences between the model and the engine, given the model dynamics and the covariance of w and v. An example of the results that can be obtained by using this type of technology on a simple mass-spring-damper system with a position sensor is shown in FIG. 6. The left side of the FIG. 60 shows the results of the sensor measurement minus the actual value using just a sensor 62, and the right side 64 shows the results of using the state estimator results minus the actual value 66. This figure indicates that by using the state estimator, which has knowledge about the engine dynamics and the sensor noise, a much more accurate value for the actual position can be determined. These same types of results can be applied to an engine system in real time during both steady state and transient engine operation.

The role of the diagnostics in this invention is to detect, isolate, and identify any deterioration, fault, failure, or damage in the gas turbine system. In some embodiments, the diagnostic system may be based on model-based diagnostics, or multi-model based diagnostics, where information from the other control components like the model and model structure, innovations, parameter updates, states, sensor values, sensor estimates, etc. are used to diagnose the engine upset. With such information, the diagnostics can determine if there is an upset, where the upset is located, and the magnitude of the upset, and then send this information to the master mode selector and to the model-based controller(s).

Using reconfigurable model predictive control(s) allows the control system to use all the information provided by the system model, estimator, master mode selector, and diagnostic system. Model predictive control (MPC) uses the model and the current state information in the control to predict the future behavior of the engine or system. Because a prediction of the future behavior can be formed given an evolution of control inputs, many different control moves can be tested over the future horizon to see which ones will track the desired references (e.g., speeds, pressure ratios, thrust, etc.), while still obeying any operating constraints (e.g., limits on the actuators, temperatures, speeds, pressures, torques, etc.). Then, once the control sequence that gives the desired results has been determined, the first control action in that sequence can be implemented at the next sample period. The process may then be repeated. The algorithm used herein allows the controller to see what the engine is going to do over the future time horizon, and at the same time know the engine operating constraints. The control can then modify all of the control actions to ensure that none of the constraints are violated while optimally satisfying the control objective. This means that the control can develop the best possible solution to meet the mission requirements.

Figure 7:
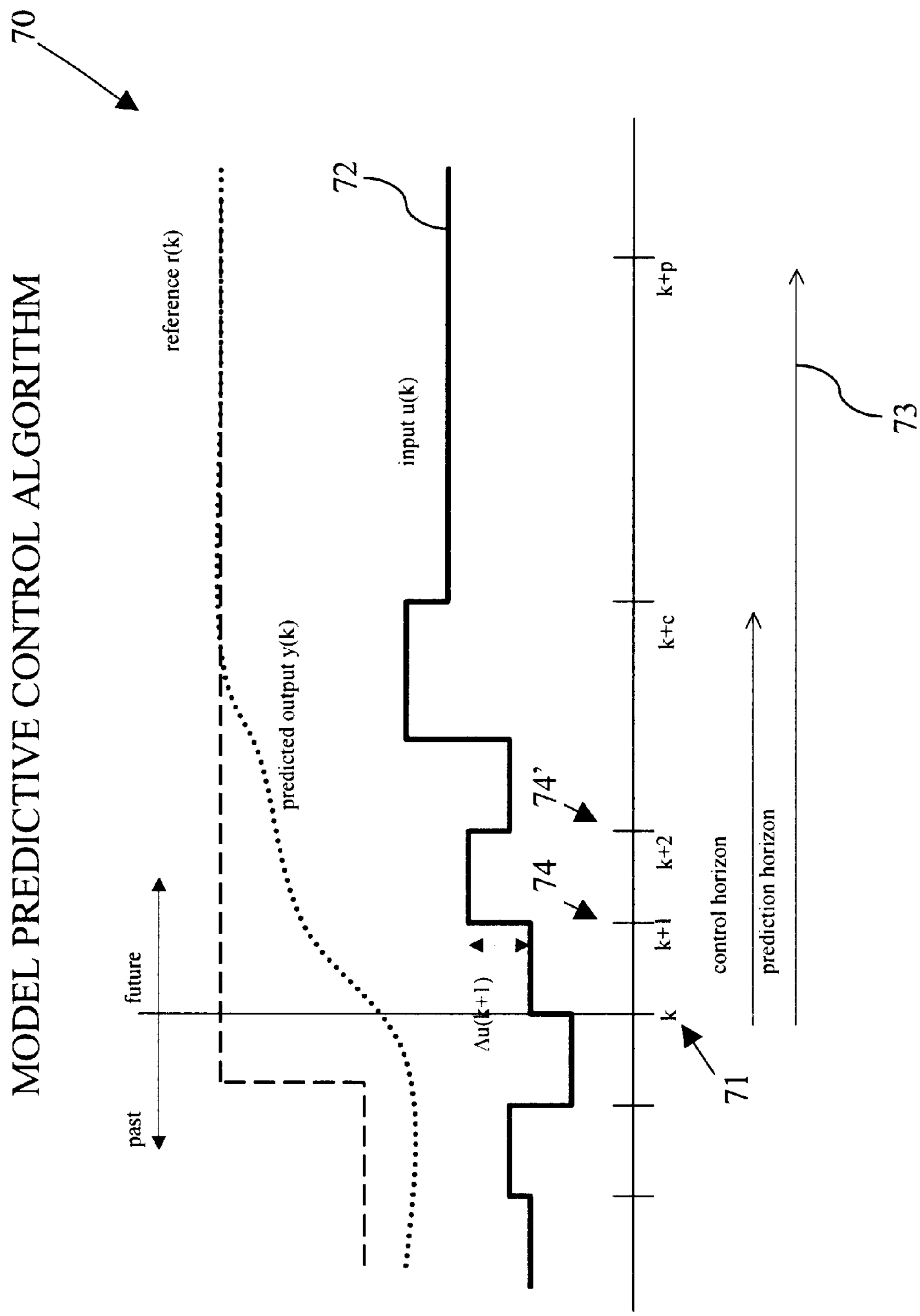
FIG. 7 is a diagram showing the basic concept of receding horizon control that underpins MPC.

The best control sequence can be determined by converting the problem into a form that an optimization algorithm can solve. MPC is based on the constrained open-loop optimization of a finite horizon objective function. This optimization commences from an assumed known initial state and uses a dynamic system model to describe the evolution of the outputs. FIG. 7 shows the basic concept of receding horizon control 70 underpinning MPC. At time k 71, the input variables 72 ($u(k), u(k+1), \ldots, u(k+p-1)$) are selected to optimize a performance criterion over the prediction horizon 73 (p). Of the computed optimal control moves, only the values for the first sample ($u(k)$), are actually implemented. Before the next time interval 74, 74' and calculation of another p input value (i.e., at $u(k+1), u(k+2), \ldots, u(k+p)$), the initial state is re-estimated from output measurements. This causes the seemingly open-loop strategy to actually implement a closed-loop control.

Figure 8:
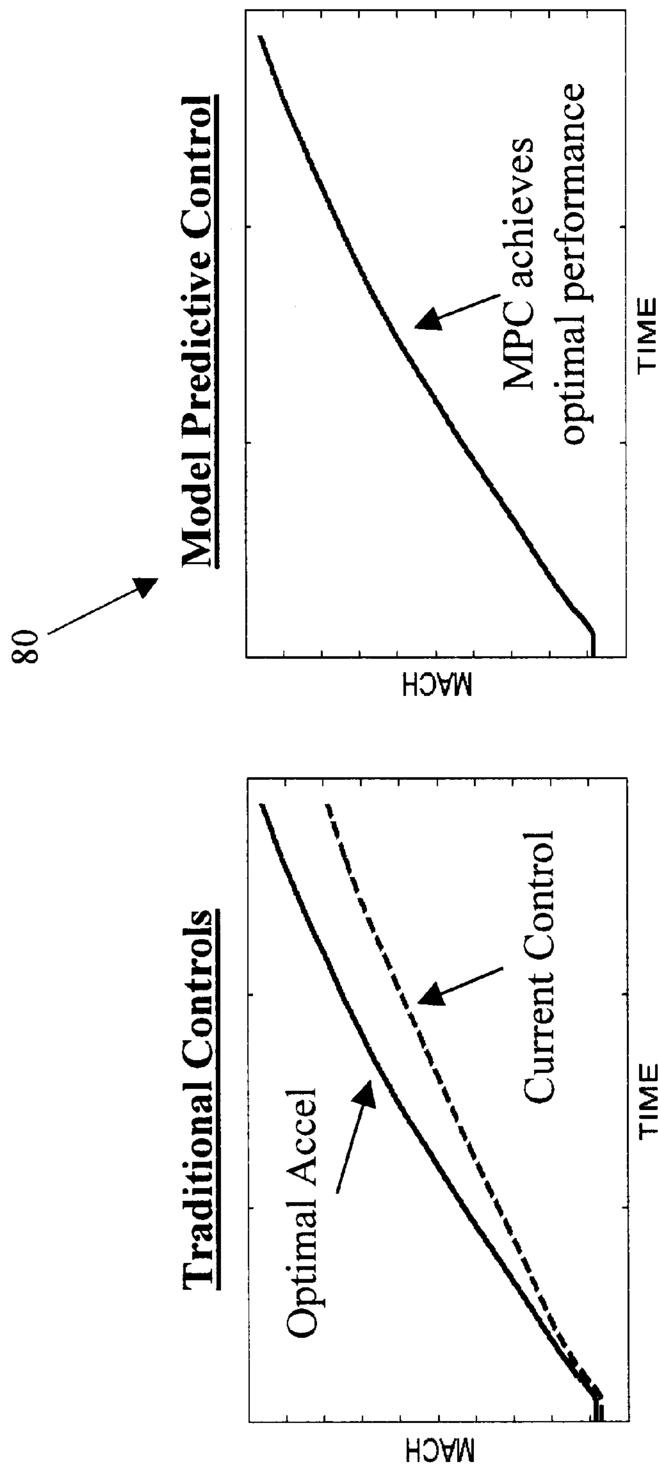
FIG. 8 shows an example of using MPC to maximize thrust or Mach number on a detailed engine and flight simulator.

The objective function is a mathematical way of defining the goal of the control system. The objective function determines what is defined as optimal. Some general objective functions are to: minimize fuel consumption, maximize thrust, maximize engine life, minimize stress, minimize temperatures, follow reference pressures, follow reference ratios of pressures, follow reference thrust or power, follow reference speed, minimize or maximize actuator command (s), follow reference flow(s), minimize dollars, and/or minimize costs. FIG. 8 shows an example of using MPC to maximize thrust or Mach number on a detailed engine and flight simulator 80. This figure shows that for this operating condition, the Mach number of the aircraft was increased 9% by using model-based optimization in the control. The optimization algorithm used inside the control can be constrained or unconstrained, linear or non-linear.

MPC with estimation gets performance and/or operability gains over conventional controls by accounting for engine-to-engine variation, deterioration, schedule approximations, and engine configuration changes. It also get performance and/or operability gains: (1) from being nonlinear and MIMO (which yields faster acceleration and improved maneuverability); (2) from being model-based (which yields lower margin requirements by running to updated model parameters); (3) from its predictive nature (which yields path shaping to increase life); and (4) from its updatable constraints (which retain operability).

Reconfigurable model predictive control (RMPC) has all the characteristics of traditional MPC, but also has additional abilities. RMPC can modify or reconfigure the models, constraints, and/or objective functions based on estimator information, diagnostic information and commands from a master mode selector. In embodiments, the first step for the reconfigurable model predictive control is to collect the data from the other system components (i.e., which model (normal or faulted) to use, the current state of the model, the covariance of the state estimates, the objective function, the constraints, and the reconfiguration information). Reconfiguration of the model may take the form of modifying input, output, or interior parameters, or it may mean switching between different models. Reconfiguration of the constraints may take the form of changing actuator position or rate limits, changing state constraints, or changing output constraints. Reconfiguration of the objective function may take the form of changing the references to follow, changing the weights of the objective function terms, or changing the goals. With any or all of the control elements reconfigured, then the optimization may be performed to determine the best possible control action to take.

A master mode selector may determine the objective function(s), constraint(s), and model(s) to be used by the reconfigurable model predictive control. This logic function may receive information from both the diagnostic function and the operator or supervisory controller. This information may then be processed to determine the correct form of the objective function, constraints, and models. This functionality is separated here for clarity of idea, but it could be located as part of the reconfigurable control or the diagnostics.

The control systems in this invention provide many advantages. They provide direct control of variables of interest, such as stall margin, thrust, etc., instead of indirect control of such variables. They explicitly handle constraints without the need for additional, complex logic. And they explicitly deal with the MIMO nature of the detected problem. Furthermore, deterioration, faults, failures and/or damage may be automatically detected and identified, and the model-based control system may be automatically reconfigured (i.e., updated) to account for such deterioration, faults, failures and/or damage. The reconfigured control system may allow the engine to provide the best possible performance and/or operability given the current state of the engine.

In this invention, prognostic and diagnostic technologies, such as heuristic, knowledge-based, model-based detection algorithms and/or multi-model hypothesis testing, are also used. Fault accommodation is also used, such as by sensor, actuator and gas path fault detection and isolation, by reconfiguring the model-based control to accommodate failures in an optimal manner.

Figure 9:
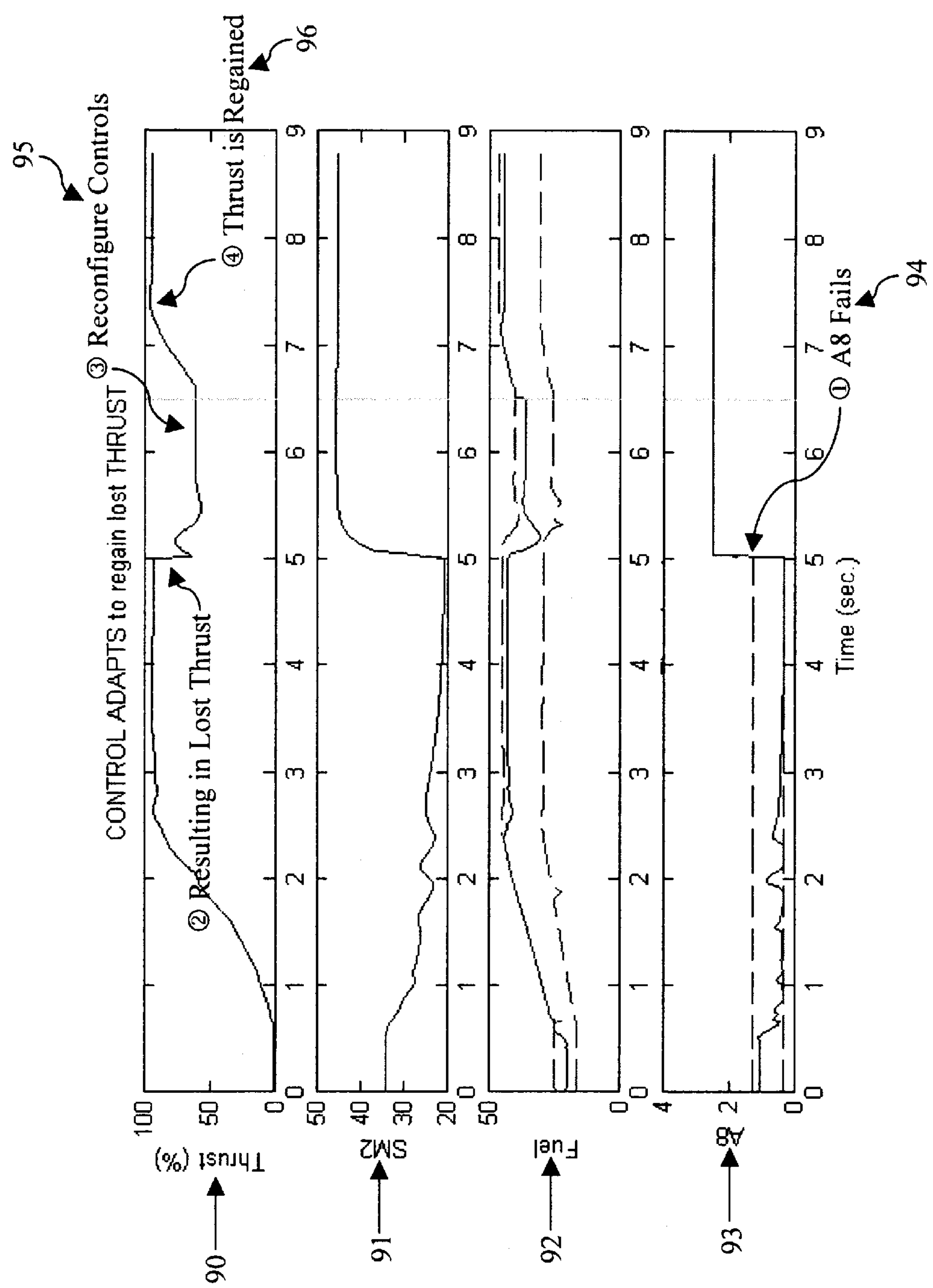
FIG. 9 is a schematic diagram showing how lost thrust was regained in one embodiment of this invention.

For example, if the variable exhaust area of an augmented gas turbine is damaged, certain things may occur. FIG. 9 shows an example of how the reconfigurable control might work. This figure shows thrust 90, fan stall margin 91 (SM2), fuel flow 92, and exhaust nozzle area 93 (A8) during a normal increase in power through the first 5 seconds. At 5.0 seconds, A8 sustains damage 94 that causes the exhaust nozzle to open to a larger-than-scheduled value and remain fixed at that position. Diagnostics detect the presence of damage, isolate the damage to the exhaust nozzle, determine the extent of the damage, and determine the A8 position or effective position. Diagnostics may tell the control that the actuator is fixed in an open position and cannot move due to damage. This information may then go to a master mode selector, which selects which objective function is to be optimized. The master mode selector may then send updated information into the control about a new constraint on the A8 actuator position (i.e., basically that the A8 actuator is no longer functioning). The master mode selector may also send an update to the objective function to regain the lost thrust. The control may then be reconfigured 95 to try to re-optimize the control so the control can attempt to increase thrust to the original desired level without violating any operating constraints 96. This may be accomplished, in this example, by increasing speed, which is done by increasing fuel flow and modifying the variable stator vanes. In embodiments, the control can change when it gets information from diagnostics or the master mode selector, the control can re-optimize the performance of the engine to ensure that the control is doing the absolute best that it can, and the control, being model-based, can operate to non-measured parameters like thrust.

Figure 10:
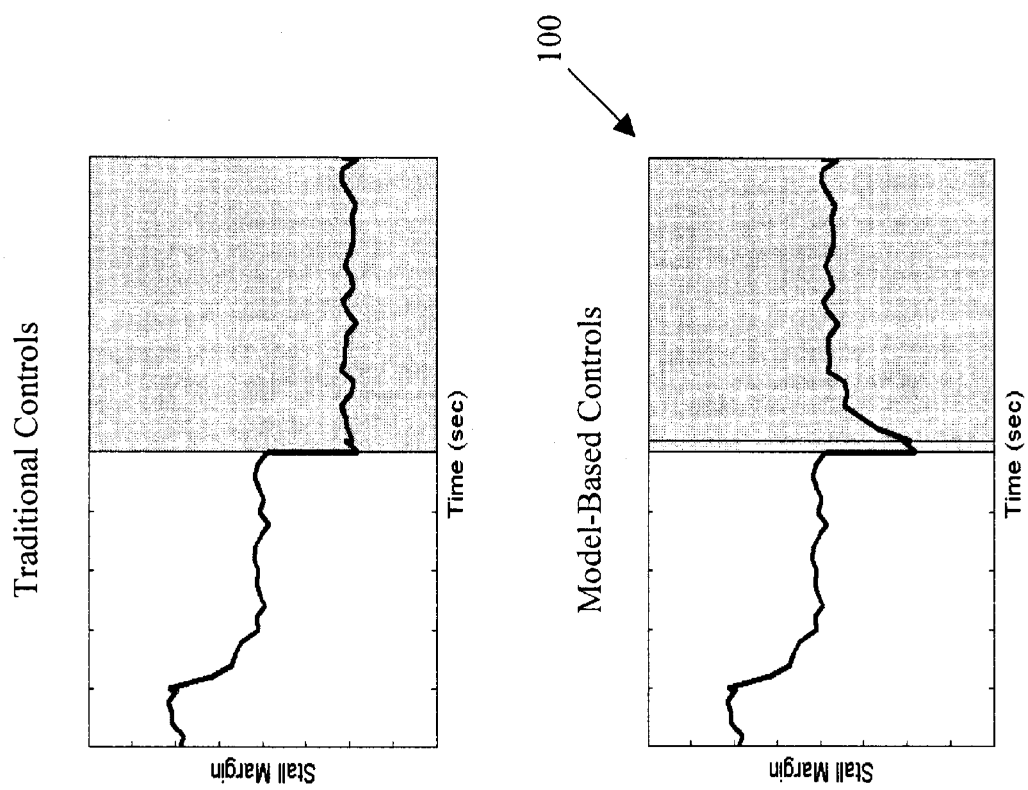
FIG. 10 is a diagram showing how lost stall margin was recovered in one embodiment of this invention.

Another study was accomplished using the model-based control systems of this invention on an augmented gas turbine. In this study, damage to the compressor caused a reduction in stall margin. After the control system detected the damage and estimated the level of the damage, this information was sent to the master mode selector and the reconfigurable model-based control. In this embodiment, the model may either be updated with the damage information, or a model with compressor damage may be selected such that the model in the control has the same characteristics as the gas turbine. Next, the objective function may be modified to regain or maximize the operability of the turbine. In this study, this caused the control to modify the variable stator vane actuator position and open a bleed valve to regain the stall margin. Thereafter, the control system was able to regain the stall margin that had been lost due to the compressor damage, without violating any other operational constraints. FIG. 10 shows how this lost stall margin was regained by the model-based control in this embodiment of this invention 100.

As described above, the adaptive model-based control systems and methods of the present invention allow deterioration, faults, failures and/or damage to be quickly detected and identified, so that optimum corrective control actions can be taken so as to regain as much performance and/or operability as possible. Advantageously, these systems and methods are adaptive so that any level of deterioration, faults, failures or damage may be accommodated, not just deterioration, faults, failures or damage that have a priori solutions already programmed into the system.

One embodiment of the present invention comprises an adaptive model-based control system method for controlling and optimizing the performance and/or operability of a gas turbine engine. This method comprises an adaptive model-based control method for controlling a gas turbine engine to optimize either performance or operability of the engine by: a) obtaining information about the current state of the engine; b) updating model data information about the engine in a model in an adaptive model-based control system to reflect the current state of the engine; c) comparing the information about the current state of the engine with the model data information about the engine in the model; d) diagnosing sensor, actuator, engine, and subsystem information and passing any updated information to a master mode selector and a reconfigurable control; e) reconfiguring a correct form of the model, constraints, objective function and other relevant control parameters; f) determining the optimal corrective control action to take given the current state of the engine, the objective function, and the constraints of the engine; g) outputting a control command to implement the optimal corrective control action; h) repeating steps a)–g) as necessary to ensure the objective function of the engine is optimized at all times.

Another embodiment of the present invention comprises an adaptive model-based control system for controlling and optimizing the performance and/or operability of a gas turbine engine. This system comprises an adaptive model-based control system for controlling a gas turbine engine to optimize either performance or operability of the engine comprising: a) a means for obtaining information about the current state of the engine; b) a means for updating model data information about the engine in a model in an adaptive model-based control system to reflect the current state of the engine; c) a means for comparing the information about the current state of the engine with the model data information about the engine in the model; d) a means for diagnosing sensor, actuator, engine, and subsystem information and passing any updated information to a master mode selector and a reconfigurable control; e) a means for reconfiguring a correct form of the model, constraints, objective function and other relevant control parameters; f) a means for determining the optimal corrective control action to take given the current state of the engine, the objective function, and the constraints of the engine; g) a means for outputting a control command to implement the optimal corrective control action; h) a means for repeating steps a)–g) as necessary to ensure the objective function of the engine is optimized at all times.

The information about the current state of the engine may comprise information about the engine itself, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and/or system damage. The model in these systems and methods may comprise a physics-based model, a linear system identification model, a nonlinear system identification model, a neural network model, a single or multivariable simplified parameter model, a single input single output model, a multiple input multiple output model, and/or any combinations of these models. Updating may comprise updating, adapting or reconfiguring a state, a variable, a parameter, a quality parameter, a scalar, an adder, a constraint, an objective function, a limit, and/or any adaptable parameter of the model or control during steady state and/or transient operation. Diagnostics occur using heuristic, knowledge-based, model-based approaches, and/or multiple-model hypothesis. The model may be updated/adapted by using a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base or other suitable method. The control command may be determined by constrained or unconstrained optimizations including: linear optimization, nonlinear optimization, linear programming, quadratic programming, sparse optimization, and/or gradient decent methods. The operations are preferably performed automatically by a computer or computing device to optimize either the performance and/or the operability of the engine.

Figure 11:
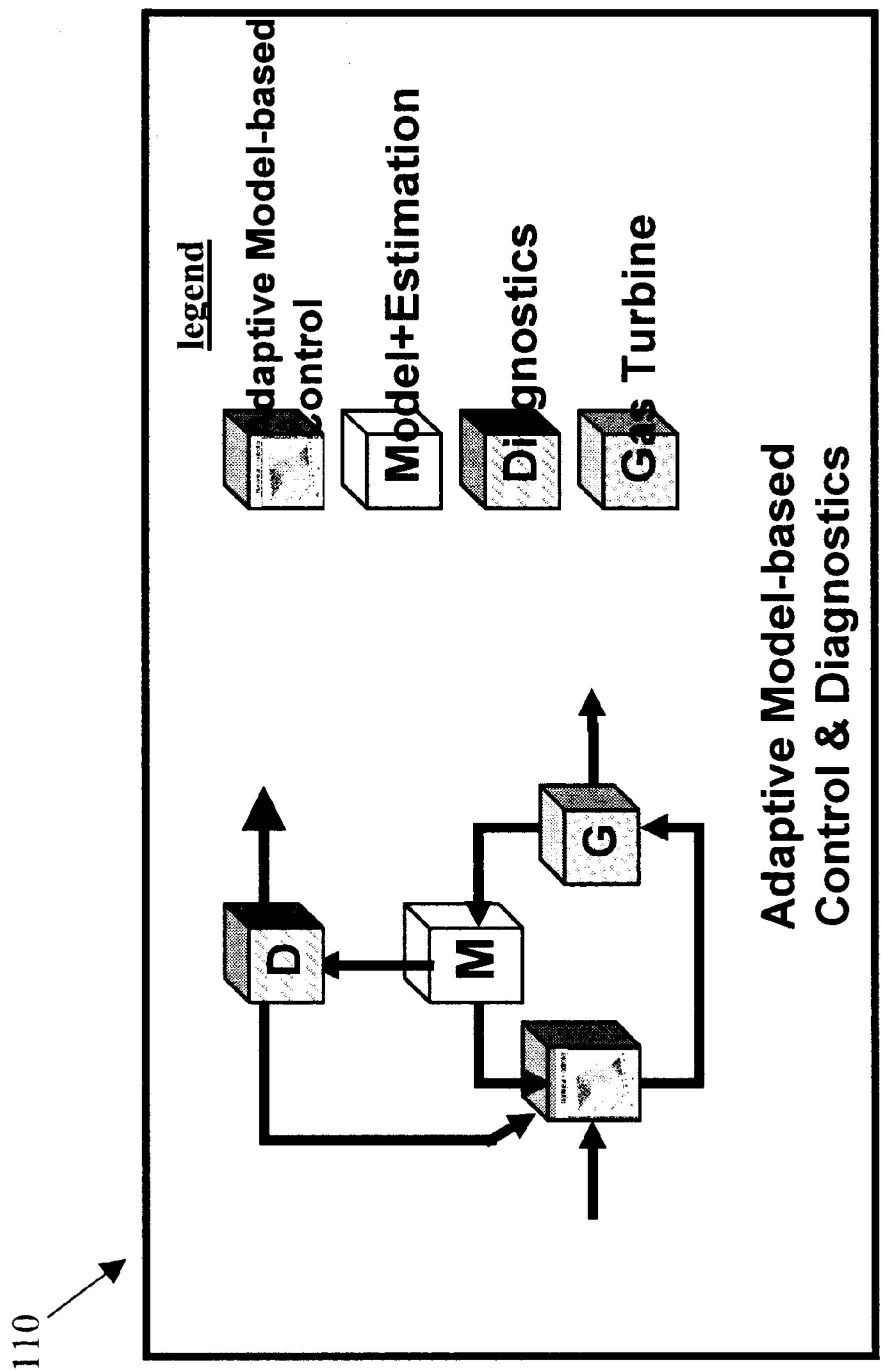
FIG. 11 shows the top level architecture of one embodiment of this invention.
Figure 12:
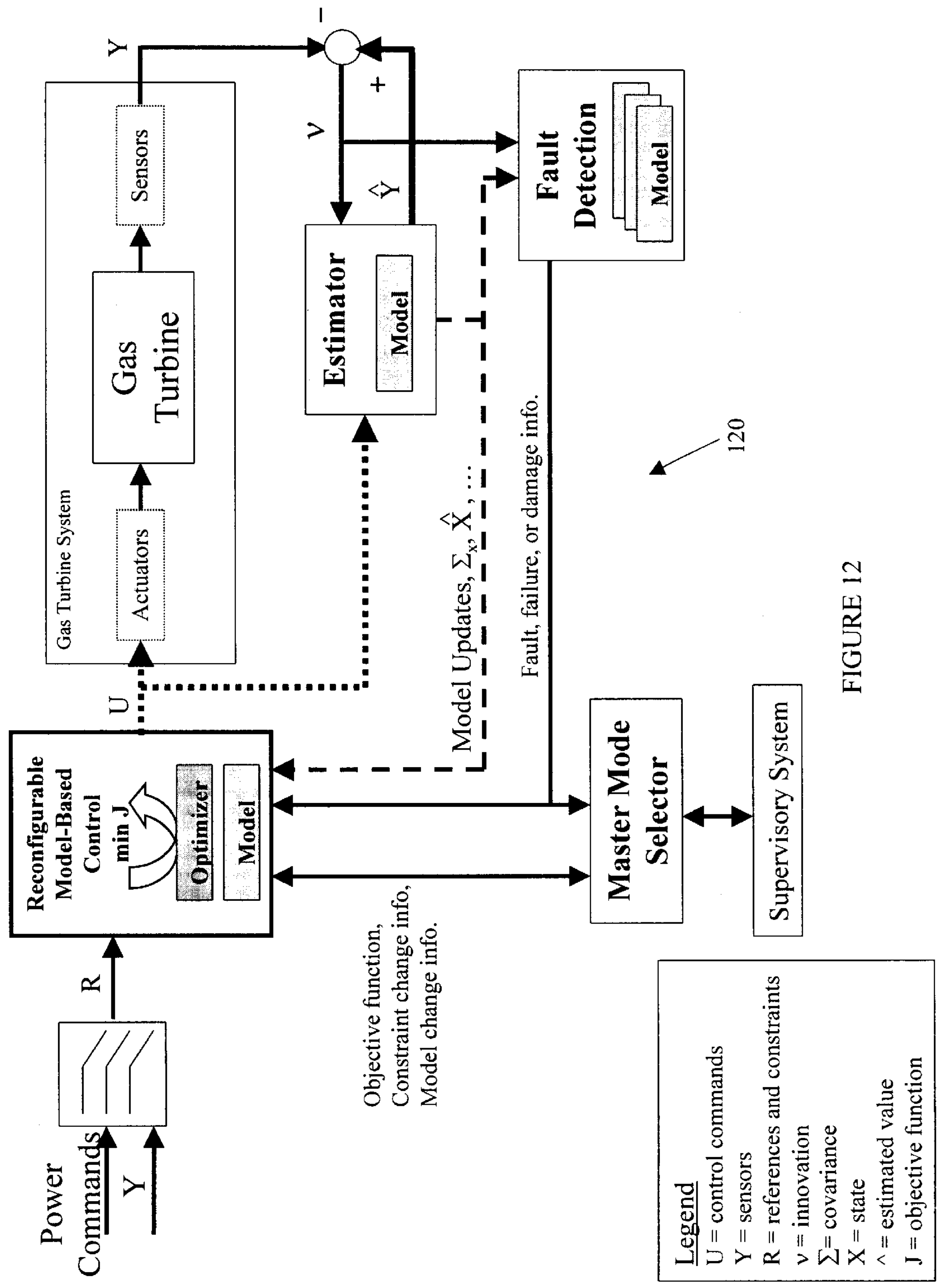
FIG. 12 shows a more detailed architecture of one embodiment of this invention.
Figure 13:
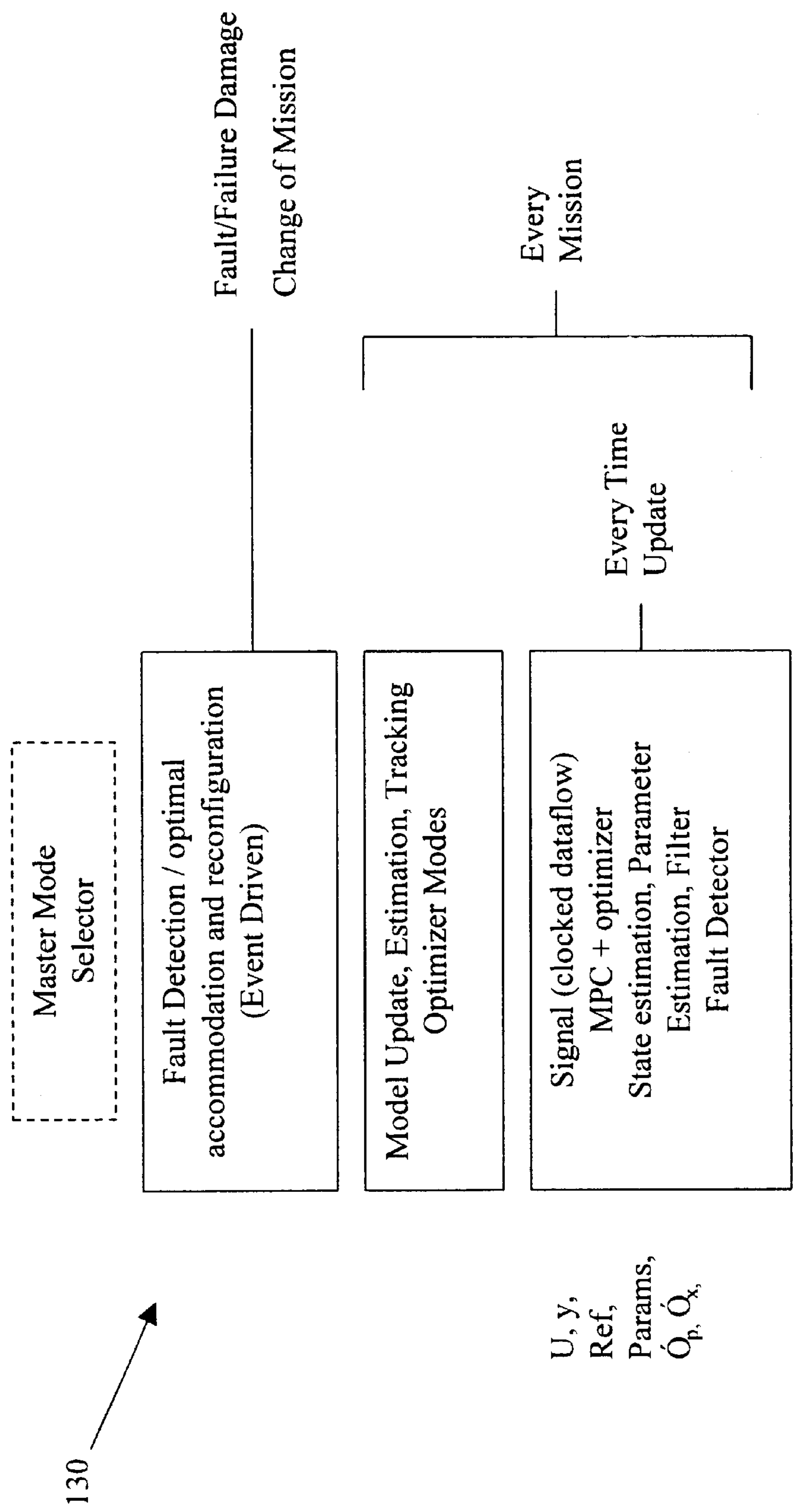
FIG. 13 shows the multi-layer control architecture of one embodiment of this invention.

Another embodiment of the present invention comprises an adaptive model-based control system for controlling the performance and/or operability of a gas turbine engine. This system comprises at least one model, at least one estimator, at least one diagnostic or fault detection algorithm, at least one reconfigurable and/or updatable model-based control, at least one optimization, and a master mode selector or functional equivalent. FIG. 11 shows an embodiment of the architecture of an embodiment of this invention at a high level 110. FIG. 12 shows an embodiment showing some of the architecture in more detail 120. FIG. 13 shows the multi-layer control architecture of one embodiment of this invention 130.

Various embodiments of the invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while this invention has been described in terms of gas turbine engine control systems and methods, numerous other control systems and methods may be implemented in the form of an adaptive model-based control as described. Thus, it is intended that the present invention cover all suitable modifications and variations as come within the scope of the appended claims and their equivalents.

What is claimed is:

1. An adaptive model-based control method for controlling a gas turbine engine to optimize either performance or operability of the engine, the method comprising:

a) obtaining information about the current state of the engine;

b) updating model data information about the engine in a model in an adaptive model-based control system to reflect the current state of the engine;

c) comparing the information about the current state of the engine with the model data information about the engine in the model;

d) diagnosing sensor, actuator, engine, and subsystem information and passing any updated information to a master mode selector and a reconfigurable control;

e) reconfiguring a correct form of the model, constraints, objective function and predetermined control parameters;

f) determining an optimal corrective control action to take given the current state of the engine, the objective function, and the constraints of the engine;

g) outputting a control command to implement the optimal corrective control action;

h) repeating steps a)–g) as necessary to ensure the objective function of the engine is optimized at all times.

2. The method of claim 1, wherein obtaining information about the current state of the engine comprises obtaining information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

3. The method of claim 1, wherein the model in the adaptive model-base control system comprises at least one of: a physics-based model, a linear system identification model, a nonlinear system identification model, a neural network model, a single simplified parameter model, a multivariable simplified parameter model, a single input single output model, and a multiple input multiple output model.

4. The method of claim 1, wherein the updating step comprises updating at least one of: a state, a variable, a parameter, a quality parameter, a scalar, an adder, a constraint, an objective function, a limit, an adaptable parameter of the model during steady state operation, and an adaptable parameter of the model during transient operation.

5. The method of claim 1, wherein the updating step comprises adapting the model using at least one of: a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base.

6. The method of claim 1, wherein the diagnosing step comprises using at least one of: (1) a heuristic, knowledge-based, model-based detection algorithm, and (2) multi-model hypothesis testing.

7. The method of claim 1, wherein the reconfiguring step comprises modifying the model, constraints, objective function and predetermined control parameters using information obtained about the current state of the engine.

8. The method of claim 1, wherein the determining step comprises utilizing an optimizer to determine the optimal corrective control action to take given the current state of the engine, the objective function, and the constraints of the engine.

9. The method of claim 1, wherein the method is performed automatically by a computer.

10. The method of claim 1, wherein the objective function comprises at least one of: optimize performance of the engine, optimize operability of the engine, maximize thrust, minimize thrust, maximize power, minimize power, maximize electricity use, minimize electricity use, maximize specific fuel consumption, minimize specific fuel consumption, maximize part life, minimize part life, maximize stress, minimize stress, maximize temperatures, minimize temperatures, maximize pressures, minimize pressures, maximize ratios of pressures, minimize ratios of pressures, maximize speed, minimize speed, maximize actuator commands, minimize actuator commands, maximize flows, minimize flows, maximize dollars, minimize dollars, maximize costs of operating the engine, minimize costs of operating the engine, maximize engine run time, minimize engine run time, maximize transient performance, minimize transient performance, maximize steady state performance, minimize steady state performance, maximize engine survivability, minimize engine survivability, manage stall margin, obtain desired references, obey any constraints, and prevent in-flight mishaps.

11. The method of claim 10, wherein the objective function is optimized.

12. The method of claim 11, wherein the objective function is optimized in the presence of at least one of: deterioration, fault, failure and damage.

13. An adaptable model-based control system for controlling a gas turbine engine to optimize either performance or operability of the engine, the system comprising:

a) a means for obtaining information about the current state of the engine;

b) a means for updating model data information about the engine in a model in an adaptive model-based control system to reflect the current state of the engine;

c) a means for comparing the information about the current state of the engine with the model data information about the engine in the model;

d) a means for diagnosing sensor, actuator, engine, and subsystem information and passing any updated information to a master mode selector and a reconfigurable control;

e) a means for reconfiguring a correct form of the model, constraints, objective function and predetermined control parameters;

f) a means for determining an optimal corrective control action to take given the current state of the engine, the objective function, and the constraints of the engine;

g) a means for outputting a control command to implement the optimal corrective control action;

h) a means for repeating steps a)–g) as necessary to ensure the objective function of the engine is optimized at all times.

14. The system of claim 13, wherein the means for obtaining information about the current state of the engine comprises obtaining information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

15. The system of claim 13, wherein the model in the adaptive model-base control system comprises at least one of: a physics-based model, a linear system identification model, a nonlinear system identification model, a neural network model, a single simplified parameter model, a multivariable simplified parameter model, a single input single output model, and a multiple input multiple output model.

16. The system of claim 13, wherein the means for updating model data information comprises a means for modifying at least one of: a state, a variable, a parameter, a quality parameter, a scalar, an adder, a constraint, an objective function, a limit, an adaptable parameter of the model during steady state operation, and an adaptable parameter of the model during transient operation.

17. The system of claim 13, wherein the means for updating model data information comprises a means for adapting the model using at least one of: a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base.

18. The system of claim 13, wherein the means for diagnosing sensor, actuator, engine, and subsystem information and passing any updated information to a master mode selector and a reconfigurable control comprises using at least one of: (1) a heuristic, knowledge-based, model-based detection algorithm, and (2) multi-model hypothesis testing.

19. The system of claim 13, wherein the means for reconfiguring a correct form of the model, constraints, objective function and other relevant control parameters comprises modifying the model, constraints, objective function and predetermined control parameters using information obtained about the current state of the engine.

20. The system of claim 13, wherein the means for determining the optimal corrective control action to take comprises a means for utilizing an optimizer to determine the optimal corrective control action to take given the current state of the engine, the objective function, and the constraints of the engine.

21. The system of claim 13, wherein the system utilizes a computer to perform each operation automatically.

22. The system of claim 13, wherein the objective function comprises at least one of: optimize performance of the engine, optimize operability of the engine, maximize thrust, minimize thrust, maximize power, minimize power, maximize electricity use, minimize electricity use, maximize specific fuel consumption, minimize specific fuel consumption, maximize part life, minimize part life, maximize stress, minimize stress, maximize temperatures, minimize temperatures, maximize pressures, minimize pressures, maximize ratios of pressures, minimize ratios of pressures, maximize speed, minimize speed, maximize actuator commands, minimize actuator commands, maximize flows, minimize flows, maximize dollars, minimize dollars, maximize costs of operating the engine, minimize costs of operating the engine, maximize engine run time, minimize engine run time, maximize transient performance, minimize transient performance, maximize steady state performance, minimize steady state performance, maximize engine survivability, minimize engine survivability, manage stall margin, obtain desired references, obey any constraints, and prevent in-flight mishaps.

23. The system of claim 22, wherein the objective function is optimized.

24. The system of claim 23, wherein the objective function is optimized in the presence of at least one of: deterioration, fault, failure and damage.

25. An adaptable model-based control system capable of controlling a gas turbine engine to optimize either performance or operability of the engine, the control system comprising:

at least one model capable of representing system behavior;

at least one estimator capable of determining a current state of the engine and adapting the model for engine-to-engine variation and deterioration;

at least one fault diagnostic capable of detecting and classifying faults and damage and providing a probability of faults;

at least one reconfigurable model-based control capable of utilizing an optimization to control engine manipulated variables to ensure optimal operation of the engine within constrained operating space; and a master mode selector capable of modifying at least one of: an objective function, a constraint, a reference, a model and a model structure using information from at least one of: an operator, a supervisory control, and fault diagnostics.

26. The control system of claim 25, wherein the system behavior comprises at least one of steady state behavior and transient behavior.

27. The control system of claim 25, wherein input to the model comprises at least one manipulated variable.

28. The control system of claim 25, wherein output from the model comprises at least one of: a sensed parameter and an unsensed parameter.

29. The control system of claim 25, wherein input to the estimator comprises at least one of: a previous control action, a sensed output, a reference, a previous parameter estimate, and a previous state estimate.

30. The control system of claim 25, wherein output from the estimator comprises at least one of: an adapted model parameter, an estimate covariance, and a state estimate.

31. The control system of claim 25, wherein input to the fault diagnostic comprises at least one of: an innovation, a previous control action, a sensed variable, a reference, a state estimate, a parameter estimate, and a database of models.

32. The control system of claim 25, wherein output from the fault diagnostic comprises fault detection, isolation and identification information.

33. The control system of claim 25, wherein input to the reconfigurable model-based control comprises at least one of: a reference, a state estimate, a parameter estimate, a covariance, a constraint, an objective function, and an objective function weight.

34. The control system of claim 25, wherein output from the reconfigurable model-based control comprises at least one control command.

35. The control system of claim 25, wherein the estimator obtains information about the current state of the engine.

36. The control system of claim 35, wherein the information about the current state of the engine comprises information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

37. The control system of claim 25, wherein the model comprises at least one of: a physics-based model, a linear system identification model, a nonlinear system identification model, a neural network model, a single simplified parameter model, a multivariable simplified parameter model, a single input single output model, and a multiple input multiple output model.

38. The control system of claim 25, wherein the master mode selector updates the model data information by modifying at least one of: a state, a variable, a parameter, a quality parameter, a scalar, an adder, a constraint, an objective function, a limit, an adaptable parameter of the model during steady state operation, and an adaptable parameter of the model during transient operation.

39. The control system of claim 25, wherein the estimator updates the model data information by adapting the model using at least one of: a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base.

40. The control system of claim 25, wherein the fault diagnostic comprises at least one diagnostic fault detection algorithm.

41. The control system of claim 25, wherein the fault diagnostic diagnoses sensor, actuator, engine, and subsystem information and passes any updated information to a master mode selector and a reconfigurable control using at least one of: (1) a heuristic, knowledge-based, model-based detection algorithm, and (2) multi-model hypothesis testing.

42. The control system of claim 25, wherein the reconfigurable model-based control determines an optimized corrective control action to take by utilizing an optimizer, given the current state of the engine, the objective function, and the constraints of the engine.

43. The control system of claim 25, wherein the master mode selector reconfigures a correct form of the model, constraints, objective function and other relevant control parameters by modifying the model, constraints, objective function and predetermined control parameters using information obtained about the current state of the engine.

44. The control system of claim 25, wherein the system is automated by a computer.

45. The control system of claim 25, wherein the objective function comprises at least one of: optimize performance of the engine, optimize operability of the engine, maximize thrust, minimize thrust, maximize power, minimize power, maximize electricity use, minimize electricity use, maximize specific fuel consumption, minimize specific fuel consumption, maximize part life, minimize part life, maximize stress, minimize stress, maximize temperatures, minimize temperatures, maximize pressures, minimize pressures, maximize ratios of pressures, minimize ratios of pressures, maximize speed, minimize speed, maximize actuator commands, minimize actuator commands, maximize flows, minimize flows, maximize dollars, minimize dollars, maximize costs of operating the engine, minimize costs of operating the engine, maximize engine run time, minimize engine run time, maximize transient performance, minimize transient performance, maximize steady state performance, minimize steady state performance, maximize engine survivability, minimize engine survivability, manage stall margin, obtain desired references, obey any constraints, and prevent in-flight mishaps.

46. The control system of claim 45, wherein the objective function is optimized.

47. The control system of claim 46, wherein the objective function is optimized in the presence of at least one of: deterioration, fault, failure, and damage.

* * * * *